Patented Aug. 7, 1951

2,563,485

UNITED STATES PATENT OFFICE 2,563,485

VINYL CHLORIDE RESINS PLASTICIZED WITH PHENYL ESTERS OF UNSATURATED FATTY ACIDS

Maxwell A. Pollack, Denville, N. J.

No Drawing. Application February 13, 1948, Serial No. 8,282

6 Claims. (Cl. 260—23)

This invention relates to new plastic compositions and in particular to compositions wherein improved properties are produced by the incorporation into plastic masses of aromatic derivatives of carboxylic acids.

In the field of vinyl chloride resins and copolymers with vinyl acetate, vinylidene choloride and similar copolymerizing materials, it has been well established that the commercial values of such products are to a very large degree dependent upon the specific nature of the softening agents or modifying plasticizers used therewith. One of the major fields of applications of such products is flexible, elastomeric sheetings, suitable for shower curtains, leather substitutes, garden hose, belting, and the like. In this field it is widely recognized that satisfactory products are very difficult to obtain because of the unavailability of plasticizers which are not deficient in some respect, such as volatility, light stability, heat stability, water extraction, etc. The usual experience is that the products fabricated with the usual plasticizers change in their properties on aging and in conditions of service, and many of these fail within a matter of months. The desired goal is to obtain products which will have service lives reckoned in terms of years, rather than months, and it is recognized that the public acceptance and demand for these products will be directly dependent upon the availability of better plasticizers which will permit the production of long-lived final products.

Many attempts to prepare such satisfactory plasticizers have been made, using aliphatic and cycloaliphatic acids as raw materials, but none has been entirely satisfactory. For example, various esters of oleic acid, such as the methyl ester, butoxyethyl ester, diethylene glycol, ester, etc., have been made and offered for this purpose, but have not been widely accepted, due to insufficient compatibility, instability to heat and light, formation of rancid breakdown products, etc. In this instance, I have discovered that when oleic acid is coupled with an aromatic nucleus, the resulting product, surprisingly enough, not only has a high degree of compatibility with the resins, but is very stable to aging, heat, light, and water, and permits the production of finished goods with a very much greater degree of permanence.

Example I

To 752 g. of oleic acid in a glass vessel was added 130 ml. of phosphorous trichloride, and the stirred mixture allowed to stand for several hours at 48–55° C. The lower phosphorous acid layer was then drawn off, and to the upper layer was added 328.5 g. of anhydrous phenol. This was mixed, and heated slowly to 115° C., whereupon the evolution of hydrogen chloride ceased. The product was washed with water and dilute sodium hydroxide until excess phenol and traces of free oleic acid, etc. were removed. The product was then dried and filtered to give a clear liquid, phenyl oleate.

Example II

In a pan were mixed 100 parts of powdered Vinylite VYNW resin (a commercial copolymer of vinyl chloride and vinyl acetate), 55 parts of the product of Example I, and 2 parts of calcium stearate. This mixture was then blended on a heated two-roll mill at 280° F. for 5 minutes, whereupon a translucent, clear, strong, and flexible sheet was obtained. Test portions were molded at 300° F. into standard 75 mil thick slabs, from which test specimens were taken for examination. This product gave tensile test results of 2481 lbs. per sq. in., a modulus of 927 lbs. per sq. in. at 100% elongation, and an ultimate elongation of 331%. No spewing or other change was observed after long standing, and the test samples did not crack when tested at −60° F. A portion was calendered into a 4 mil sheet, which was very soft and pliable, and of good "hand." It had very low water and soap extraction, and was well suited to the production of shower curtains, for example.

The heat stability results on this specimen were outstanding, giving very little change and darkening on heating at 250° F. for 24 hours.

Example III

To 1.0 mole of oleic acid chloride was added 1.1 mole of p-phenylphenol. This was heated as in Example I until no more HCl would come off, and was then refined with water and dilute alkali. The final product, p-phenylphenyl oleate, was very compatible with polyvinyl chloride resin, giving flexible sheets of a high degree of permanence.

Example IV

To 1.0 mole of oleic acid chloride was added 1.1 mole of m-chlorophenol. This was heated as in Example I until no more HCl would come off, and then refined with water and dilute alkali. The final product, m-chlorophenyl oleate, was very compatible with polyvinyl chloride resins and copolymers, giving flexible sheets of a high degree of permanence.

Example V

To 1.0 mole of oleic acid chloride was added 1.1 moles of m-cresol. This was heated as in Example I until no more HCl would come off, and then refined with water and dilute sodium hydroxide. The final product, m-cresyl oleate, was very compatible with vinyl chloride resins and copolymers, giving flexible sheets of a high degree of permanence.

The phenols disclosed in the above examples are monohydric.

Instead of the above-mentioned phenols, other aromatic compounds may be used. These include p-cresol, p-tertiary butyl phenol, p-chlorophenol, dichlorophenols, or other halogenated phenols, α-naphthol, β-naphthol, hydroquinone, methyl ether of hydroquinone, catechol, methyl gallate, etc. Excellent results are also obtained using aromatic amines, such as aniline, m-methyl aniline, p-phenyl aniline, o-chloroaniline, and naphthylamines, etc.

Instead of oleic acid, other acids can be used, such as those, for example, available in fats, such as olive oil, tallow, soybean oil, peanut oil, fish oils, and other animal and vegetable fats. It was a surprising finding that the combination of fatty acids such as the above with aromatic nuclei should give compounds which acted as heat and light stabilizers for vinyl chloride resins, in view of the fact that the fatty acids and fats are so susceptible to oxidation and heat and light instability, because these materials contain unsaturated acids. Apparently the combination of aromatic and aliphatic units in the same molecule is a unique structure, efficiently adapted for stabilization. The fatty acids disclosed are higher fatty acids containing 16 or more carbon atoms to the molecule.

Other carboxylic acids can be coupled with aromatic nuclei to give greatly improved and novel plasticizer compounds. For example, naphthenic acids, as obtainable from petroleum, can be esterified in the above way with phenol, substituted phenols, etc. to give good plasticizers. Other unsaturated cycloaliphatic acids, such as abietic, dihydroabietic, etc. can be used, as well as rosin and other natural resins of the type. Thus, for example, tall oil, which is essentially a combination of oleic acid and rosin acids, a by-product in wood pulp processing, can be coupled with aromatic nuclei to give good plasticizers of very low cost.

I have found also that these aromatic esters and amides readily undergo rearrangement on treatment with such catalysts as aluminum chloride, zinc chloride, boron fluoride, and the like, to produce nuclear-substituted phenols and aromatic amines, which are extremely useful compounds as plasticizers, oil additives, antioxidants, germicides, etc. For example, p-chlorophenyl caprylate may be treated with aluminum chloride, then washed and dried, to give 2-octoyl, 4-chloro-phenol, which is a good plasticizer for polyamide resins such as hexamethylene adipamide, etc., as well as being useful in disinfectants, plan control compositions, etc. This class of compounds may be identified as acylphenols and acylanilines, wherein the acyl group is aliphatic or cycloaliphatic.

The products of this invention may be used as modifiers for a wide variety of resins, including vinyl chloride resins, these vinyl chloride resins including polyvinyl chloride and copolymers of vinyl chloride with other vinyl monomers, vinyl acetal resins, acrylate and methacrylate resins, polystyrene, butadiene-styrene copolymers, butadiene-acrylonitrile copolymers, natural rubber, vinylidene chloride, polyamides, such as hexamethylene adipamide, nitrocellulose, cellulose acetate, cellulose propionate, cellulose acetate-butyrate, benzyl cellulose, phenol-formaldehyde, urea-formaldehyde, melamine-formaldehyde, alkyd resins, such as glyceryl phthalate, glyceryl maleate, glycol maleate, etc. The term polyvinyl resin is used herein to mean resinous materials resulting from polymerization involving the vinyl group $CH_2:C$ which occurs in all vinyl monomers and which is the unit responsible for the polymerization to the resinous polymers.

These plasticizers may be used alone, as the only plasticizer in any particular plastic composition, or they may be mixed with each other or with other plasticizers and modifying ingredients, such as dibutyl phthalate, dibutyl sebacate, tricresyl phosphate, halogenated diphenyl, nitrodiphenyl, etc.

It is obvious that this invention is broad in scope, and therefore many variations will be clear to the trained chemist and engineer. These variations are intended to be included in the scope of the invention.

I claim:

1. A resin composition comprising a vinyl chloride resin and an ester of a monohydric phenol with an acid selected from the group consisting of unsaturated monocarboxylic higher fatty acids containing at least 16 carbon atoms to the molecule and unsaturated monocarboxylic cycloaliphatic acids, the said ester serving as a light and heat stable plasticizer for the vinyl resin.

2. A composition as described in claim 1, the said monohydric phenol represented in the ester being phenol.

3. A resin composition comprising a vinyl chloride resin and an oleate of a monohydric phenol serving as a light and heat stable plasticizer for the resin.

4. A composition of matter comprising a vinyl chloride resin and an ester of a monohydric phenol with abietic acid serving as plasticizer for the resin.

5. A resin composition comprising a vinyl chloride resin and phenyl oleate serving as a light and heat stable plasticizer for the resin.

6. A resin composition comprising a vinyl chloride resin and the phenyl esters of tall oil serving as a light and heat stable plasticizer for the resin.

MAXWELL A. POLLACK.

REFERENCES CITED

The following references are of record in the file of this patent:

UNITED STATES PATENTS

| Number | Name | Date |
|---|---|---|
| 970,662 | Sulzberger | Sept. 20, 1910 |
| 2,198,970 | Muller | Apr. 30, 1940 |
| 2,345,006 | Ross et al. | Mar. 28, 1944 |
| 2,361,322 | Schroy | Oct. 24, 1944 |
| 2,369,985 | Safford | Feb. 20, 1945 |
| 2,371,957 | Derby | Mar. 20, 1945 |
| 2,374,126 | Peters | Apr. 17, 1945 |
| 2,409,336 | Young | Oct. 15, 1946 |
| 2,423,981 | Kaltreider | July 15, 1947 |